United States Patent [19]

Laufer

[11] Patent Number: 4,557,287
[45] Date of Patent: Dec. 10, 1985

[54] PRESSURE CONTROL VALVE FOR FUEL INJECTION PUMPS

[75] Inventor: Helmut Laufer, Stuttgart, Fed. Rep. of Germany

[73] Assignee: Robert Bosch GmbH, Stuttgart, Fed. Rep. of Germany

[21] Appl. No.: 664,890

[22] Filed: Oct. 25, 1984

[30] Foreign Application Priority Data

Nov. 15, 1983 [DE] Fed. Rep. of Germany ....... 3341300

[51] Int. Cl.$^4$ ............................................. G05D 24/00
[52] U.S. Cl. ..................................... 137/115; 137/468; 137/514.5
[58] Field of Search ............ 137/115, 116, 494, 514.5, 137/468

[56] References Cited

U.S. PATENT DOCUMENTS

| | | | |
|---|---|---|---|
| 2,323,021 | 6/1943 | Ernst | 137/514.5 X |
| 3,323,533 | 6/1967 | Reimer | 137/115 X |
| 3,832,095 | 8/1974 | Alcima | 137/115 X |
| 4,252,141 | 2/1981 | Burgdorf | 137/514.5 X |

OTHER PUBLICATIONS

SAE-Paper 79 0899, pp. 3-4.

Primary Examiner—Alan Cohan
Attorney, Agent, or Firm—Michael J. Striker

[57] ABSTRACT

In a pressure control valve for a fuel injection pump, which includes a piston displaceable in the cylinder by the pressure fluid admitted in the cylinder and against the force of a restoring spring which biases the piston, the piston is closely guided in the cylinder with an annular gap which can be maintained constant. The piston includes one portion which forms the annular gap with the wall of the cylinder and two lateral guide portions closely guided in the cylinder. The annular gap is in communication with the pressure control chamber and the spring chamber formed in the cylinder. A throttle is formed at the discharge of the spring chamber. The amount of fuel flowing through the annular gap builds up a compensation pressure at the throttle to compensate for the influence of temperature fluctuations in the fluid admitted in the pressure control chamber of the cylinder.

5 Claims, 1 Drawing Figure

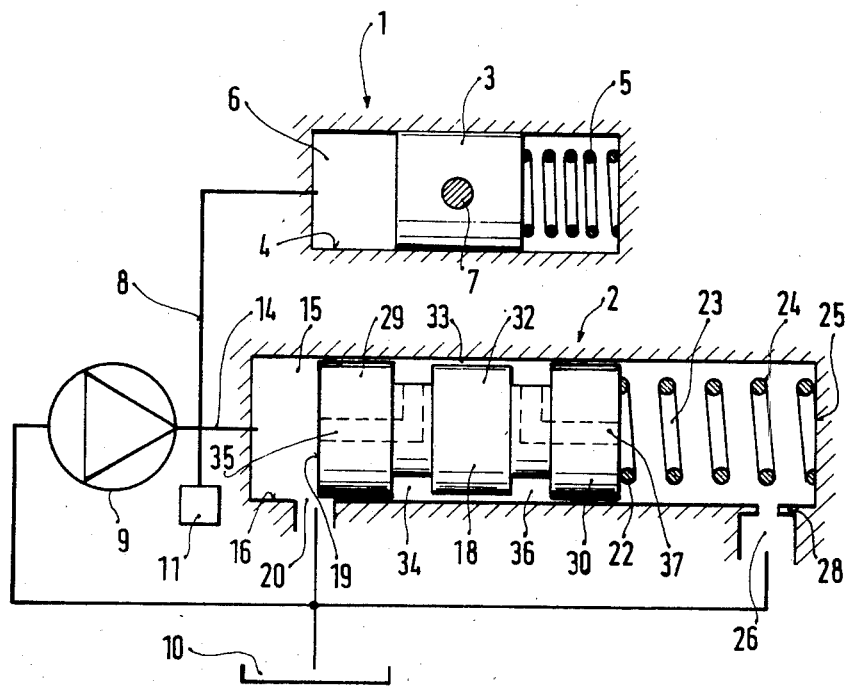

PRESSURE CONTROL VALVE FOR FUEL INJECTION PUMPS

BACKGROUND OF THE INVENTION

The present invention relates to a pressure control valve for fuel injection pumps.

Pressure control valves of the foregoing type include a cylinder with a piston displaceable therein and biased by a spring on one side thereof. A throttle is provided in the spring chamber of the cylinder through which leaking fuel is discharged from the cylinder to the fuel supply tank. In such pressure control valves an annular gap is provided at the entire periphery of the piston and extends over its entire length. The piston of the pressure control valve is also guided within the cylinder of the valve with a relatively great gap, which is disadvantageous because the position of the piston in the radial direction is not fixed so that the piston can take any possible positions relative to the wall of the cylinder in the radial direction. This, however, means that it is not ensured that the width of the annular gap will be maintained constant. With the one-side position of the piston, partially the gap of a substantially greater width will result so that in this position of the piston the amount of fuel flowing through the gap can vary for example by 2.5 as compared to that for the concentrically positioned piston.

In the conventional device the annular gap, in connection with the control pressure chamber and the spring chamber formed in the cylinder, and together with an aperture-shaped throttle serve to compensate for the influence of the viscosity, changing with temperature fluctuations, on the pressure of the fluid being controlled. The amount of fuel flowing through the annular gap directly depends on the viscosity of the flowing medium while the amount of fuel flowing through the throttle does not depend on the viscosity. A pressure in the spring chamber of the cylinder results from the difference of both amounts of flowing fuel, which pressure is dependent upon the viscosity and exerts on the piston a compensating additional force. When now the amount of fuel flowing through the annular gap changes in dependence on the position of the piston the influence of the errors caused by temperature fluctuation on the pressure being controlled is rather considerable.

SUMMARY OF THE INVENTION

It is an object of the present invention to provide an improved pressure control valve for a fuel injection pump.

It is another object of this invention to provide a pressure control valve in which the coaxial position of the piston with the central axis of the cylinder, in which the piston is guided, would be ensured and the geometry of the region of the annular gap would not be changed.

These and other objects of the invention are attained by a pressure control valve for fuel injection pumps, comprising a cylinder; a piston displaceable in said cylinder by a pressure fluid, said cylinder enclosing a spring chamber formed at one end face of said piston and being relieved by a throttle, and a control pressure chamber formed at another end face of said piston; a restoring spring positioned in said spring chamber and loading said piston; a fluid supply pump supplying fluid into a fuel injection pump space loaded with fluid, the pressure of which is to be controlled, said control pressure chamber being connected to said space to admit the pressure fluid, whereby, the piston is adjustable by the fluid pressure against the force of said restoring spring; a pressure fluid unloading tank connected to said throttle, said cylinder being formed at said pressure control chamber with a downflow opening connected to said fluid unloading tank and controlled by said piston upon the displacement thereof in said cylinder, said piston being positioned in said cylinder with an annular gap provided between an outer periphery of the piston and a peripheral wall of said cylinder, said annular gap forming a connection between said control pressure chamber and said spring chamber, said piston including at the periphery thereof at least one guiding portion, at which the piston is guided with a close fit relative to said peripheral wall of the cylinder, and another piston portion forming with said peripheral wall said annular gap, said guiding portion being formed with at least one passage which is connected to said another end face of the piston and opens at the periphery of the piston between said guiding portion and said another portion.

The present invention offers the possibility that the compensating pressure in the spring chamber of the cylinder would be very precisely determined by the geometry of the annular gap between said another piston portion and the inner wall of the cylinder and by the geometry of the throttle provided in the spring chamber of the cylinder.

The valve piston may be formed with a circular groove which separates said guiding portion from said another portion, said passage opening into said groove. This specific feature of the invention ensures that the annular gap is uniformly loaded with fuel.

The piston may include two guiding portions which are formed at two sides of said another portion, one of said guiding portions forming said one end face and having a first passage opening at said one end face into said spring chamber, and the other of said guiding portions forming said another end face and having a second passage which opens at said another end face into said control pressure chamber, said first and second passage connecting said control pressure chamber and said spring chamber, respectively, with said annular gap. Thereby a very precise guidance of the piston within the cylinder is warranted.

The piston may have a first circular groove separating said one guiding portion from said another piston portion, and a second circular groove separating the other guiding portion from said another piston portion, said first passage opening into said first circular groove and said second passage opening into said second circular groove.

Each of the passages may be formed as an elongated groove in the associated guiding portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure of the drawing schematically illustrate a pressure control valve for fuel injection pumps, according to the invention.

DETAILED DESCRIPTION OF THE PREFERRED EMBODIMENT

Referring now to the drawing in greater detail, reference numeral 1 designates an injection time adjusting device 1, with the aid of which, for example a cam ring is rotated. The injection time-adjusting device 1 is necessary in fuel injection pumps, for example for the adjustment of an injection start in dependence upon the number of revolutions of the pump. The injection time-adjustment must be undertaken, among other things, in dependence upon the number of revolutions of the pump. With known fuel injection pumps a hydraulic control pressure is generated, the pressure level of which is changed in dependence on the number of revolutions by means of a pressure control valve 2. The fuel injection pump, in which the injection timer 1 and the pressure control valve 2 are employed, is not illustrated herein in detail because other structural components of this pump are conventional. The injection time-adjusting device 1 includes a cylinder 4 in which a piston 3 is displaceable. Piston 3 is loaded at one side thereof with a restoring spring 5, which is supported against the wall of the cylinder. On its other side piston 3 is loaded with an adjustable control pressure which prevails in a working chamber 6 which is limited at the end face of piston 3. The latter is connected by means of a linkage 7 with a gearing of the fuel injection pump. A pressure conduit 8 opens into working chamber 6 of cylinder 4. Another end of pressure conduit 8 is connected to a pressure side of a fuel supply pump 9. Pump 9 sucks fuel from a fuel tank 10 and feeds it into a schematically shown suction chamber 11 of the non-illustrated fuel injection pump, from which fuel is received for a high pressure injection. A further pressure fluid passage 14 branches off the pressure side of the fuel supply pump 9. Pressure fluid passage 14 opens into a pressure chamber 15 of a cylinder 16 of the pressure control valve. A piston 18 is movably positioned in cylinder 16. Piston 18 limits with its first end face 19 the pressure chamber 15 and also controls a downflow sectional area 20 on the radial wall of the cylinder 16. The second end face 22 of the piston 18 limits in cylinder 16 a spring chamber 23, in which a restoring spring 24 is positioned, which is supported at its one end against the piston end face 22 and at its opposite end against the end wall surface 25 of cylinder 16. A relief or unloading conduit 26 leads from the spring chamber 23 to the fuel storage tank 10 to the suction side of the fuel supply pump 9, and a throttle or aperture 28 is formed between the piston-side spring chamber 23 and the unloading conduit 26.

Piston 18 of the pressure control valve 2 is subdivided into three portions, of which the first one is a guide zone 29 in the form of the piston portion which terminates at the end face 19, the second one is a guide zone on 30, also in the form of the piston portion and terminated at the second end face 22, and the third portion is an intermediate, annular gap zone 32 in the form of the piston portion and extended between the aforementioned guide portions. The first guide portion 29 and the second guide portion 30 are positioned in the cylinder 16 with a small clearance relative to the adjacent wall of the cylinder, which ensures that piston 18, upon its displacement is guided in cylinder 16 tightly and coaxially with the central axis of the cylinder. The annular gap 33 is formed by a permanent distance between the piston outer surface and the cylindrical wall of cylinder 16, so that a precise guidance of the guide portions 29 and 30 in cylinder 16 is ensured.

A first circular groove 34 is provided between the first guide portion 29 and intermediate portion 32. A passage 35 starting at the first end face 19 of the piston opens into the groove 34. A second circular groove 35 is provided between the intermediate portion 32 and second guide portion 30 of the piston 18. A passage 37 starting at the second and face 22 opens into groove 36. The configuration of passages 35 and 37 is optional; for example it can be realized in the form of an outer elongated groove in the guide portion 29 and guide portion 30. A single guide portion may be provided in piston 18 in place of two guide portions forming the guide regions, respectively, so that one of the circular grooves and one of the passages 35 or 37 would be omitted.

The fuel supply pump 9 is driven regularly synchronously with the fuel injection pump and change the amount of fuel pumped with changing of the number of revolutions of the pump. The increasing pressure effects the displacement of piston 18 which, with the increase of the number of revolutions, opens a greater portion of the sectional area 20. Due to a restoring action of spring 24 the feed pressure of the fuel supply pump rises in this manner and can be linearly maintained in the desired regions. Besides the sectional area or opening 20, fuel also flows through passage 35, annular gap or clearance 33, passage 37 and aperture 28 towards the fuel supply tank 10. The amount of fuel flowing through the annular gap 33 depends upon the viscosity of the fuel, which in turn depends on the temperature of the fuel. The amount of fuel flowing through the throttle 28 does not, however, change substantially with various viscosities, The device according to the invention has the effect that when more fuel flows through annular gap 33 at increased temperatures an increased pressure builts up in the spring chamber 23 in front of aperture 28, which pressure loads the piston 18 with the assistance of restoring spring 24 and tends to reduce an open portion of the sectional area 20. The amount of leaking fuel occurring with increasing temperatures is compensated for in this manner so that the adjustable control pressure has no components depending on temperature fluctuations.

Due to the proposed construction a predetermined leakage fuel portion is positively maintained by an even annular gap, with the aid of which a compensation force, exerted on the piston 18, can be calculated. The amount of leaking fuel flowing in the guide regions of the pressure control valve 2 is, respectively, so small that a variable position of piston 18, which has been discussed above, has no substantial effect on the entire amount of leaking fuel so that an extremely precise compensation force can be built up on the piston and temperature fluctuations are no longer essential in the adjustment of the control pressure.

It will be understood that each of the elements described above, or two or more together, may also find a useful application in other types of pressure control valve for fuel injection pumps differing from the types described above.

While the invention has been illustrated and described as embodied in a pressure control valve for a fuel injection pump, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure control valve for fuel injection pumps, comprising a cylinder; a piston displaceable in said cylinder by a pressure fluid, said cylinder enclosing a spring chamber formed at one end face of said piston and being relieved by a throttle, and a control pressure chamber formed at another end face of said piston; a restoring spring positioned in said spring chamber and loading said piston; a fluid supply pump supplying fluid into a fuel injection pump space loaded with fluid, the pressure of which is to be controlled, said control pressure chamber being connected to said space to admit the pressure fluid, whereby the piston is adjustable by the fluid pressure against the force of said restoring spring; a pressure fluid-unloading tank connected to said throttle, said cylinder being formed at said pressure control chamber with a downflow opening connected to said fluid unloading tank and controlled by said piston upon the displacement thereof in said cylinder, said piston being positioned in said cylinder with an annular gap provided between an outer periphery of the piston and a peripheral wall of said cylinder, said annular gap forming a connection between said control pressure chamber and said spring chamber, said piston having at the periphery thereof at least one guiding portion, at which the piston is guided with a close fit relative to said peripheral wall of the cylinder, and another piston portion forming with said peripheral wall said annular gap, said guiding portion being formed with at least one passage which is connected to said another end face of the piston and opens at the periphery of the piston between said one portion and said another portion.

2. The pressure control valve as defined in claim 1, wherein said piston is formed with a circular groove which separates said guiding portion from said another portion, said passage opening into said groove.

3. The pressure control valve as defined in claim 1, wherein said piston includes two such guiding portions which are formed at two sides of said another portion, one of said guiding portions forming said one end face and having a first passage opening at said one end face into said spring chamber, and the other of said guiding portions forming said another end face and having a second passage which opens at said another end face into said control pressure chamber, said first and second passage connecting said control pressure chamber and said spring chamber, respectively, with said annular gap.

4. The pressure control valve as defined in claim 3, wherein said piston has a first circular groove separating said one guiding portion from said another piston portion, and a second circular groove separating the other guiding portion from said another piston portion, said first passage opening into said first circular groove and said second passage opening into said second circular groove.

5. The pressure control value as defined in claim 4, wherein each of said passages is formed as an elongated groove in the associated guiding portion.

* * * * *